(12) United States Patent
Tschirch

(10) Patent No.: US 6,821,669 B2
(45) Date of Patent: Nov. 23, 2004

(54) LIQUID ELECTROLYTE BATTERY

(75) Inventor: Steffen Tschirch, Zschopau (DE)

(73) Assignee: IQ Battery Research & Development GmbH, Floha (DE)

(*) Notice: Subject to any disclaimer, the term of this patent is extended or adjusted under 35 U.S.C. 154(b) by 78 days.

(21) Appl. No.: 09/928,490

(22) Filed: Aug. 14, 2001

(65) Prior Publication Data
US 2002/0028373 A1 Mar. 7, 2002

Related U.S. Application Data

(63) Continuation of application No. 09/319,585, filed as application No. PCT/DE98/01472 on May 28, 1998, now abandoned.

(30) Foreign Application Priority Data
Oct. 10, 1997 (DE) .......................................... 197 44 863

(51) Int. Cl.[7] .............................................. H01M 2/38
(52) U.S. Cl. ............................ 429/81; 429/51; 429/70
(58) Field of Search .............................. 429/51, 81, 70, 429/72, 204

(56) References Cited

U.S. PATENT DOCUMENTS

| | | | | |
|---|---|---|---|---|
| 4,074,021 A | * | 2/1978 | Aronson | 429/51 |
| 4,963,444 A | * | 10/1990 | Delaney | 429/67 |
| 5,032,476 A | | 7/1991 | Kirby | |
| 5,096,787 A | * | 3/1992 | Delaney et al. | 429/81 |
| 5,212,024 A | * | 5/1993 | Klink et al. | 429/72 |
| 5,543,243 A | * | 8/1996 | Brecht | 429/51 |
| 5,599,636 A | * | 2/1997 | Braun | 429/7 |
| 5,665,484 A | * | 9/1997 | Bolger | 429/62 |

* cited by examiner

Primary Examiner—Patrick Ryan
Assistant Examiner—Tracy Dove
(74) Attorney, Agent, or Firm—Burns, Doane, Swecker & Mathis, L.L.P.

(57) ABSTRACT

The invention relates to a liquid electrolyte battery, which is preferably used in moving vehicles, such as e.g. in cars, boats or aircraft. The battery contains devices bringing about a circulation of the electrolyte. This circulation is produced by means producing a pumping action and consequently a flow during battery movement. Devices are also provided which bring about a circulation by thermal convection.

13 Claims, 19 Drawing Sheets

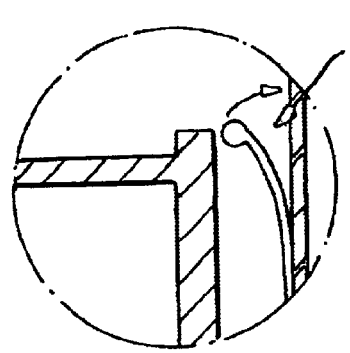 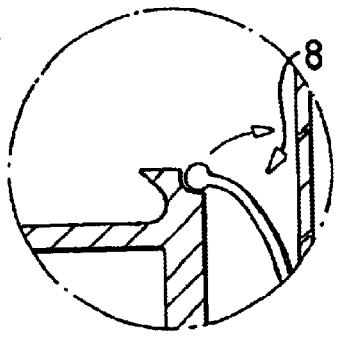 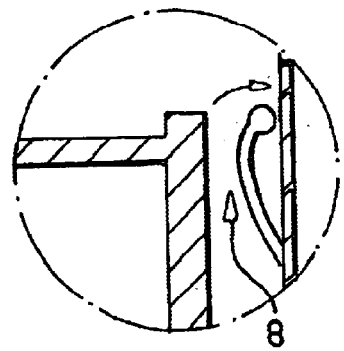
Fig. 11a  Fig. 11b  Fig. 11c
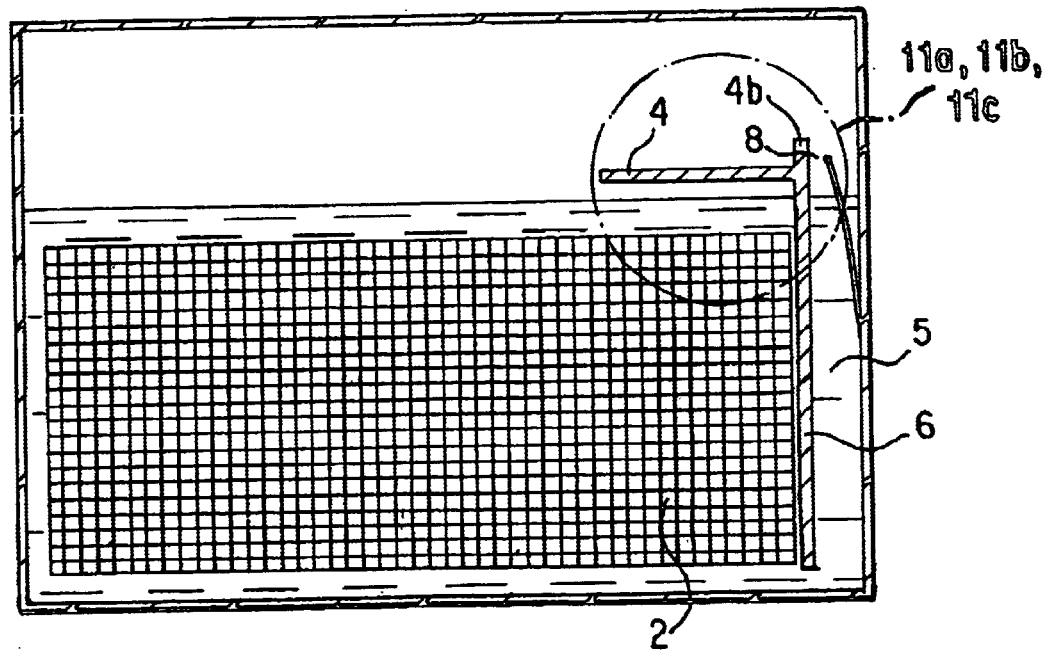
Fig. 11

LIQUID ELECTROLYTE BATTERY

This application is a continuation of U.S. Application Ser. No. 09/319,585 filed on Sep. 10, 1999 now abandoned, which was a national stage filing under 35 U.S.C. §371 of International Application No. PCT/DE98/01472 filed on May 28, 1998, which International Application was not published by the International Bureau in English on Apr. 22, 1999.

BACKGROUND OF THE INVENTION

The invention relates to a liquid electrolyte or electrolytic battery, which is preferably used in moving vehicles, such as e.g. cars, boats or aircraft.

The efforts more particularly made by the vehicle industry for lightweight construction also concerns the economizing of battery weight. However, there is at the same time an increasing demand for a higher battery power, because in addition to conventional energy for starting the vehicle, energy is also required for additional units such as electric window regulators, actuators or servomotors for adjusting seats and for the electric heating of the seats. It is desirable to keep the battery power at a constant high level over the entire battery life.

The prior art discloses various measures for increasing the power of a conventional lead acid battery. The term power is here understood to mean the capacity of the battery and the current output and consumption capability of the battery.

A particular problem arising with lead acid batteries is the optimum complete use of the electrode surface. FIGS. 1 to 3 are intended to illustrate the problem known from the prior art. FIG. 1 is a sectional representation of a car battery 1 along its electrodes 2, which have a grid form in the present construction. The level of the battery acid 3 is designated 3a. Research has revealed that the chemical characteristics of the battery acid differ significantly in the areas designated a, b and c. Thus, in area a the acid concentration is too high, which leads to corrosion and ultimately to the disintegration of the plates. In area c the acid concentration is too low, i.e. the electrolytic characteristics necessary for the operation of the battery do not exist.

Only in the central area b does the acid have the optimum stoichiometric ratio. Thus, the existing electrode surface is not utilized in an optimum manner due to the inadequate acid characteristics in areas a and c. It is clear to the expert that the areas are not sharply defined in the manner shown.

In order to also improve the stoichiometric ratio in areas a and c, it is known from the prior art to circulate the battery acid, i.e. the electrolyte, in order to obtain a better intermixing. This simultaneously prevents the formation of deposits, which impair the function and life of the battery.

DE-U1 9114909 discloses a storage battery, in which by means of the introduction of gas from a pressurized gas source, an electrolyte circulation is brought about. Due to their complicated construction such devices are unsuitable for vehicle batteries, particularly as additionally a pressurized gas source is needed.

The prior art also discloses electrolyte intermixing devices, which can be called hydrostatic pumps. FIGS. 29a, 29b and 29c show the basic operation of such a device. FIG. 29a is a sectional representation of an electrolyte-filled battery box, which has a double bent plate 21, a portion of the angle projecting beyond the electrolyte surface. To facilitate understanding the electrode plates are not shown. If the battery box installed in a vehicle moves at a uniform speed v, i.e. the vehicle neither accelerates nor decelerates, the electrolyte surface is flat and horizontal. FIG. 29b shows that during a braking process, due to the mass moment of inertia, the electrolyte builds up to a wave in the travel direction and the electrolyte splashes over the upper portion of the plate edge. As now the liquid level between the angle and the casing wall is higher, according to FIG. 29c the electrolyte flows downwards until the two levels have evened out. The arrows show the electrolyte flow direction.

This principle is inter alia described in U.S. Pat. No. 4,963,44, U.S. Pat. No. 5,096,787 and U.S. Pat. No. 5,032,476. However, the inventors of the present invention have found that with the devices known from this prior art it is not possible to achieve an optimum electrolyte intermixing.

Therefore the problem of the invention is the provision of a liquid electrolyte battery for vehicles, in which the necessary higher battery capacity and life are to be achieved mainly through an improved electrolyte intermixing.

SUMMARY OF THE INVENTION

One aspect of the invention involves providing a plate element that extends across upper edges of the electrodes to restrain an upward flow of surging electrolyte and thereby intensify an upward float of electrolyte through a vertical flow channel. The advantage of the invention is that the liquid electrolyte circulating device brings about a high degree of intermixing and consequently the battery capacity is significantly increased and simultaneously the battery life is lengthened. The liquid electrolyte circulating device has no free moving parts, whose movement could be impeded by electrolyte deposits. Therefore this device operates very reliably. In addition, the liquid electrolyte circulating device is very inexpensively manufacturable and can be readily integrated into the battery manufacturing technology. Unlike in the case of the prior art, hydrostatic electrolyte pumps, this device pumps the electrolyte from bottom to top. The inventors have proved that in this way intermixing can be significantly improved. Obviously it is advantage for intermixing purposes if the thicker bottom acid is forced upwards and runs out over the horizontal part of the intermixing device, in order to mix with the thinner surface acid.

In the case of a liquid electrolyte battery further developed, parallel to the vertical edges is provided a second, plate-like element, in order to form a flow channel. Thus, the flow conditions can be set in a more clearly defined manner and optimized.

In a liquid electrolyte battery further developed, the first plate-like element and the second plate-like element are constructed in one piece as angles, so that in certain cases an easier assembly is possible.

In a liquid electrolyte battery further developed, in the vicinity of the upper edge of the first plate-like element is provided a first return flow preventer for preventing the return flow of a first electrolyte wave, which improves intermixing.

In a liquid electrolyte battery further developed, the return flow preventer is constructed as a web-like material extension of the first plate-like element, which is particularly cost-effective.

In a liquid electrolyte battery further developed, the return flow preventer is constructed as a flap valve, which particularly effectively prevents a return flow.

In a liquid electrolyte battery further developed, the liquid electrolyte circulating device is placed on both casing sides, which brings about an improved intermixing.

Another advantage of the invention is that through heat convection there is even a thorough mixing or intermixing when the battery is only slightly moved or not moved at all, the heating elements being so positioned that a powerful electrolyte flow can be produced.

Use is made of panel heaters, which are placed on or in the casing wall. If the battery is constructed from two cell groups, which are interconnected by a common partition, the heating means can be placed on said partition located in the center of the battery. Virtually no heat losses occur in this embodiment.

For the protection of the electrode plates a heat shield is provided, so that the electrolyte heated by the heating means does not pass directly to the electrode plates. In a particularly preferred embodiment, part of the mechanical circulating device is simultaneously used as a heat shield, so that both a mechanically caused and a thermally caused circulation of the electrolyte takes place.

An advantage of the invention is that in the same way as for producing a convection by means of heating elements, an intermixing still occurs if the battery moves only slightly or is stationary.

The cooling involves the same effect, but it is brought about with different means. Thus, there can be a combination thereof with the mechanical circulating device.

BRIEF DESCRIPTION OF THE DRAWINGS

Further measures and advantages of the invention can be gathered from the following description of embodiments in conjunction with the attached diagrammatic drawings.

FIGS. 11, 11a, 11b and 11c show a third embodiment of the invention in detail, wherein FIG. 11 schematically shows a first type of flap valve, and FIGS., 11a, 11b and 11c show first, second and third embodiments, respectively, of the second type of flap valve.

FIGS. 12a, 12b, 12c show first, second, and third embodiments, respectively, of the second type of flap valve.

FIGS. 21a, 21b, 21c show an angular mixing device in conjunction with specially constructed flow channels, wherein FIG. 21a shows a flow channel-forming structure, and FIGS. 21b and 21c show first and second ways, respectively, of positioning the structure of FIG. 21a.

FIGS. 22a, 22b show another form of a mixing device, wherein FIG. 22a shows the mixing device in a first direction, and FIG. 22b shows the mixing device in a second direction oriented ninety degrees to the first direction.

FIGS. 26a, 26b show another form of a mixing device, wherein FIG. 26a is a top perspective view thereof, and FIG. 26b is a top view thereof.

FIGS. 29a–29c show schematically a prior art battery, wherein FIG. 29a shows the battery in a rest condition, FIG. 29b shows the battery at an initial stage of vehicle deceleration, and FIG. 29c shows the battery immediately following a termination of the deceleration.

DETAILED DESCRIPTION OF PREFERRED EMBODIMENTS

Figure 1:
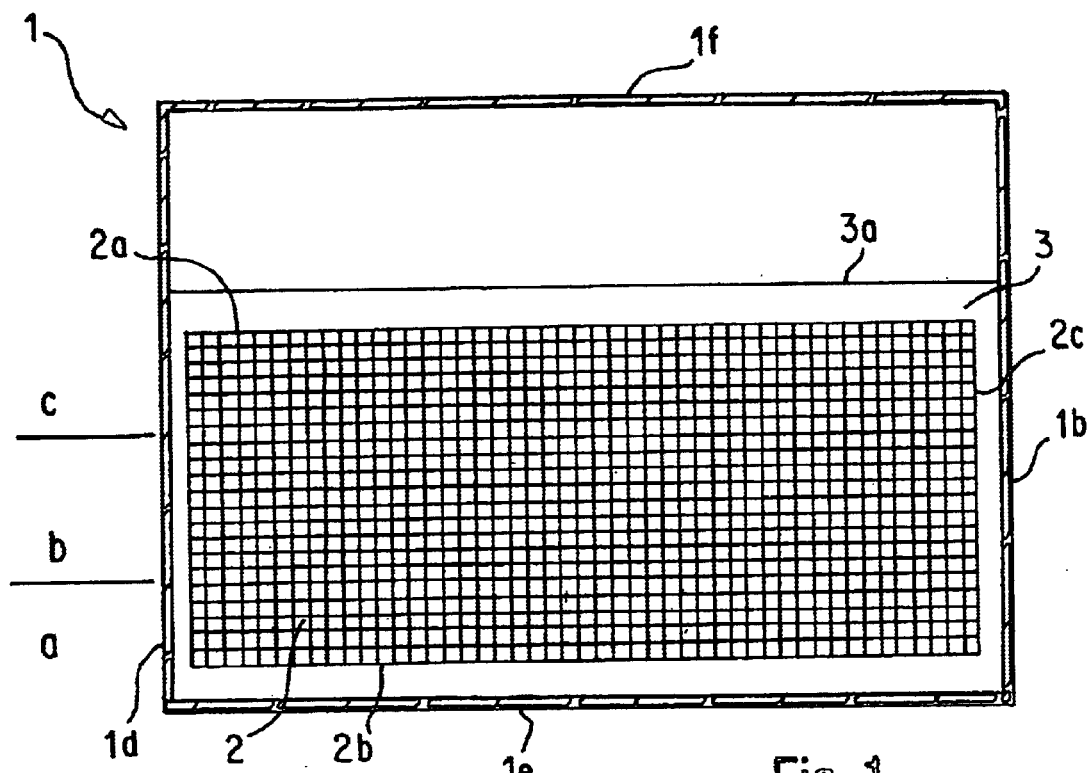
FIG. 1 shows a side longitudinal section of a liquid electrolyte battery according to the prior art.
Figure 2:
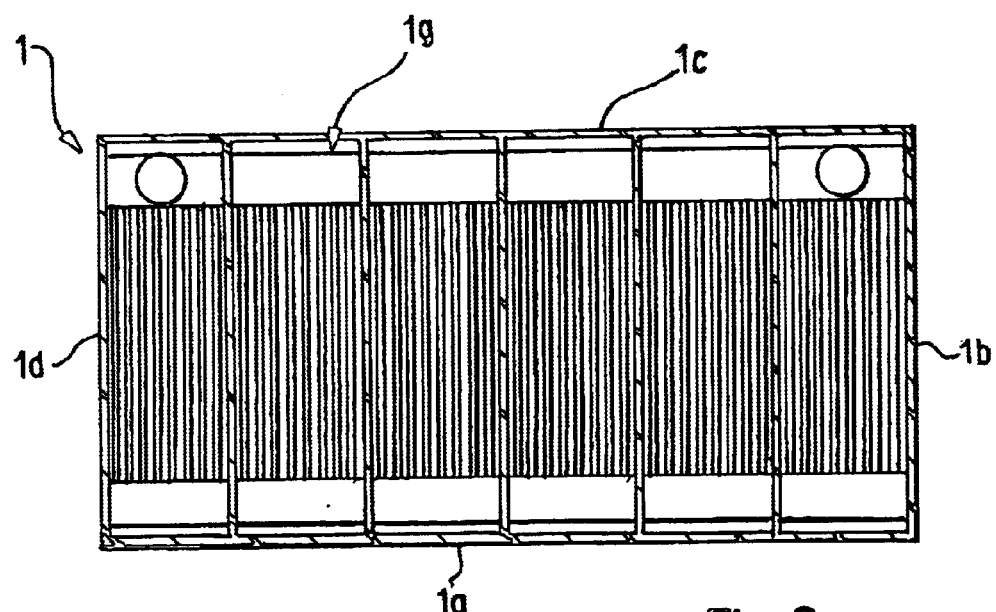
FIG. 2 shows the plan view of an open liquid electrolyte battery according to the prior art.

FIGS. 1 and 2 serve for illustration purposes and show a liquid electrolyte battery according to the prior art with a casing 1 having side walls 1a, 1b, 1c, 1d, a casing bottom 1e and a lid 1f. Electrodes 2 are placed in vertically standing manner in the individual cells 1g, each of which contains a liquid electrolyte 3, which is approximately 1 cm above the upper edge of the electrodes 2.

Figure 3:
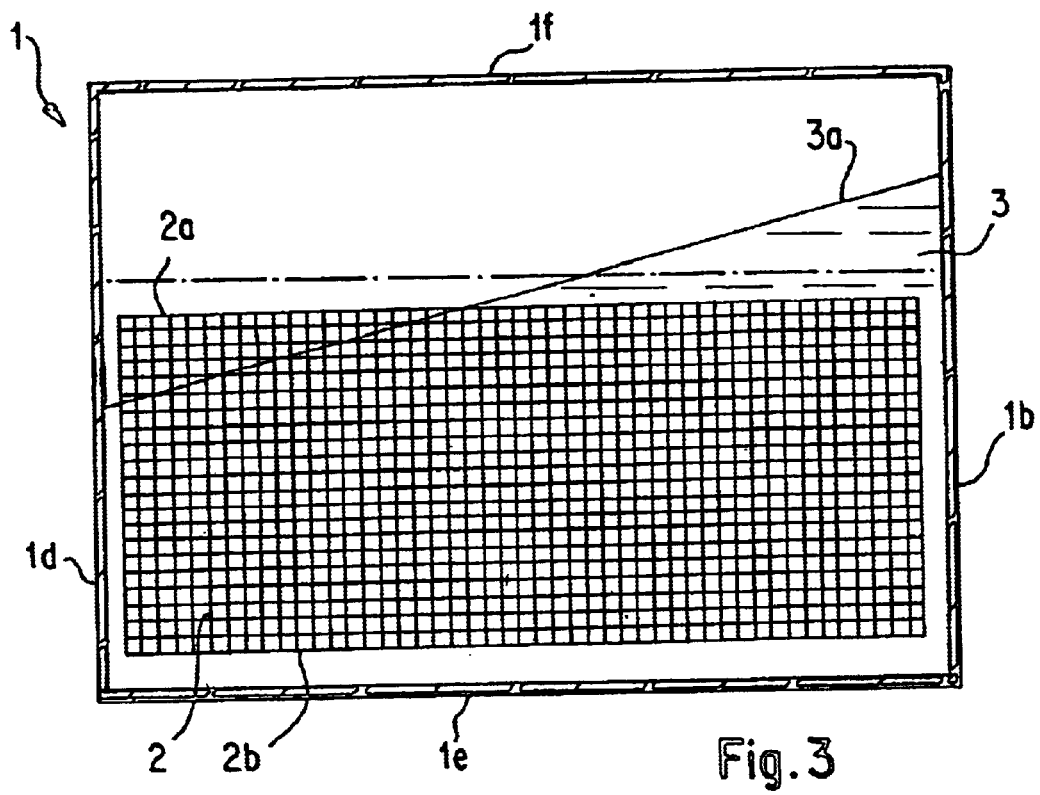
FIG. 3 shows the view of FIG. 1, the liquid electrolyte battery undergoing an acceleration and the electrolyte level is inclined.

FIG. 3 shows the representation of FIG. 1, the liquid electrolyte battery undergoing an acceleration and the electrolyte level is inclined. This situation arises if the battery is e.g. installed in a car in such a way that the electrode plates extend in the direction of travel, which In the present example passes in the image plane from left to right. If the moving vehicle is decelerated, as a result of the mass moment of inertia of the electrolyte, it splashes in the direction of travel, which is only diagrammatically intimated by the sloping level. During travel there is only a slight electrolyte movement between the plates, without any significant intermixing occurring.

Figure 4:
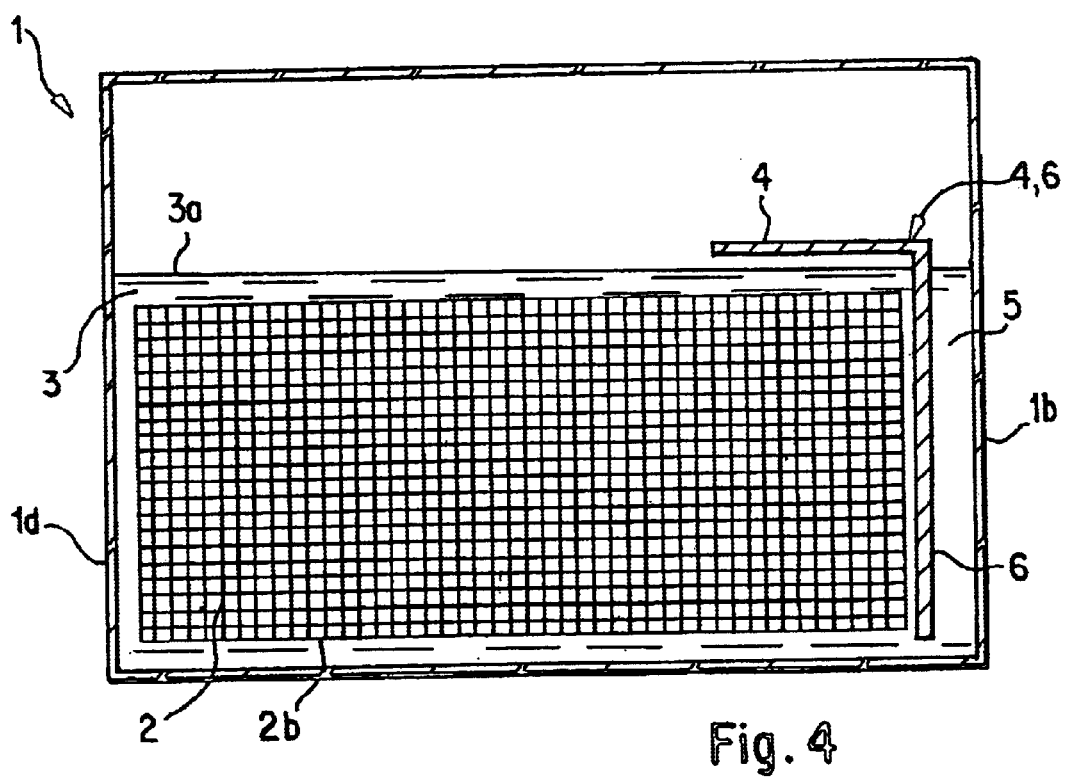
FIG. 4 shows a first embodiment of the invention.

FIG. 4 shows a first embodiment of the invention. A right-angle element 4, 6 is inserted in such a way that a vertical side thereof is parallel to the vertical plate edges. Its horizontal side is parallel to the upper edges 2a of the plates 2 in the vicinity of the level 3a of electrolyte 3, and extends across those upper edges.

Figure 5:
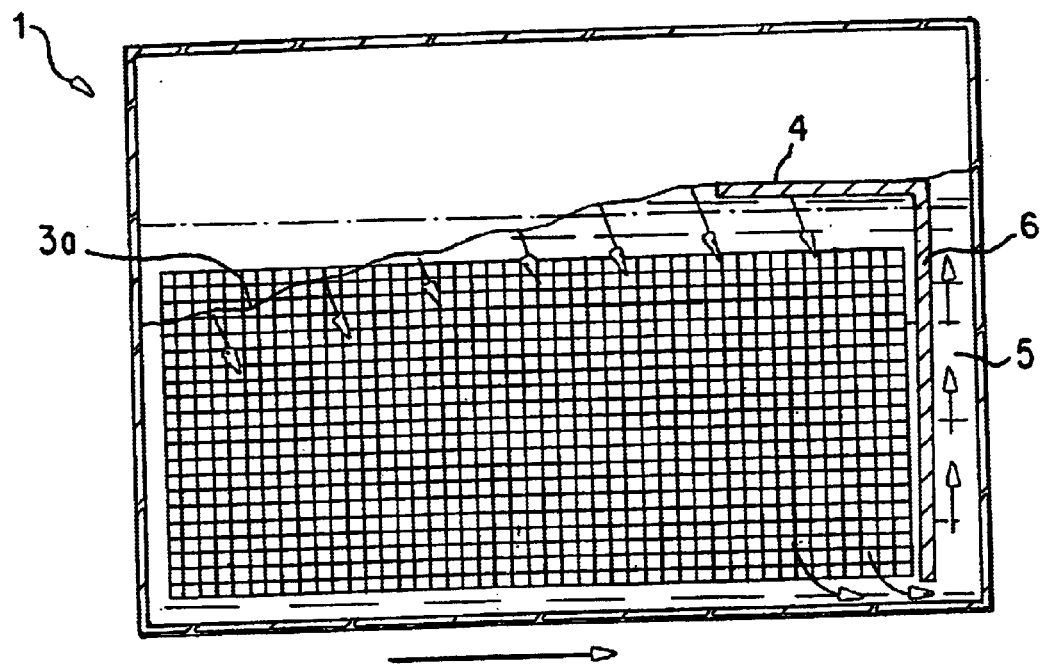
FIG. 5 shows the first movement phase of the electrolyte surface during an acceleration.

If the above-described braking situation arises, the angle portion 4 prevents the described splashing movement of the surging electrolyte 3. FIG. 5 diagrammatically shows the movements forced on the electrolyte by the angle element 4–6. Particular mention is made of the fact that the electrolyte in the vertical flow channel 5, which extends between the vertical side of the angle and the cell wall, is forced strongly upwards, which is diagrammatically represented by the upwardly directed arrows.

Figure 6:
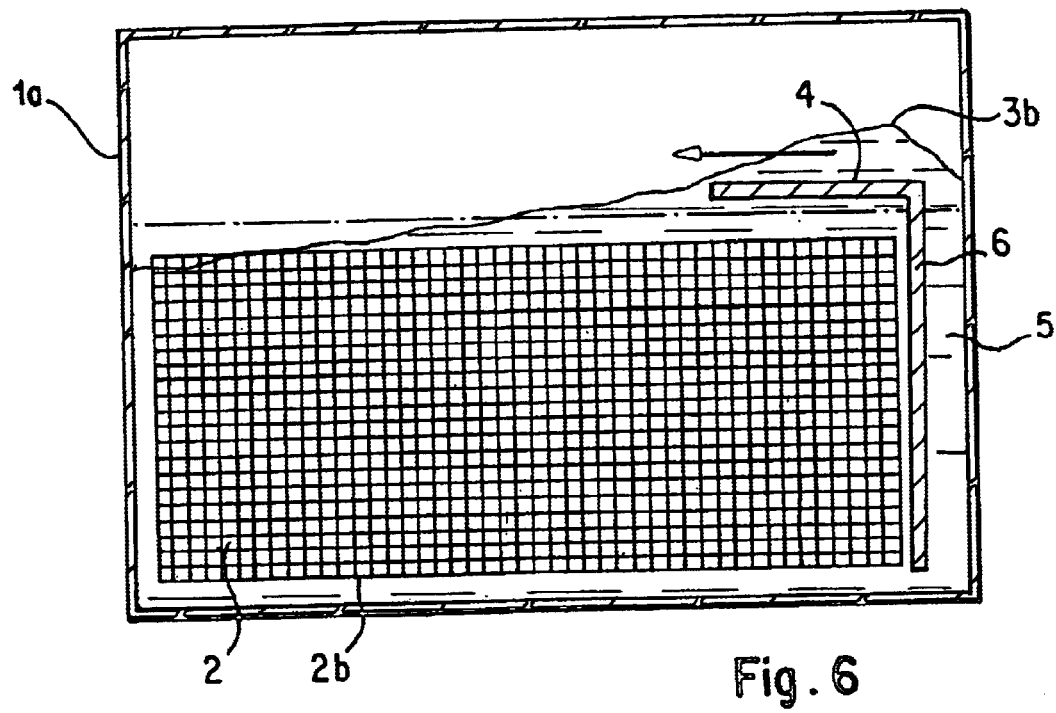
FIG. 6 shows the second movement phase of the electrolyte surface after acceleration.
Figure 7:
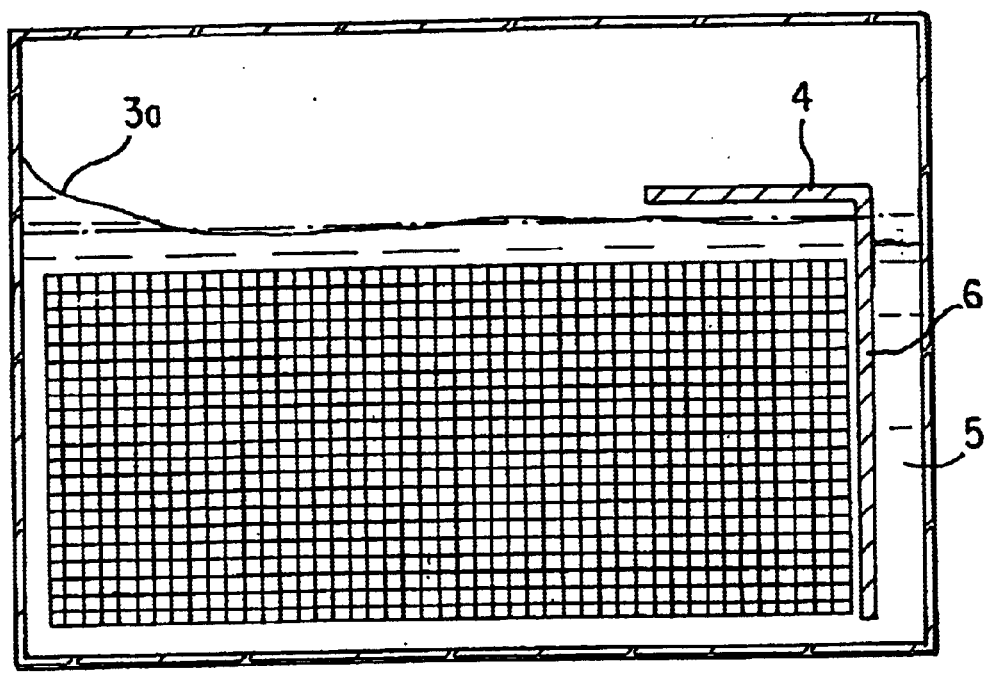
FIG. 7 shows the third movement phase of the electrolyte surface after the acceleration.

FIG. 6 shows the next time period, in which an electrolyte crest 3b has formed on the horizontal angle side and subsequently flows away as a wave in the arrow direction and runs out again at wall 1d and can again form an electrolyte crest (FIG. 7).

The above statements make it clear that the angle and its spatial arrangement in the battery casing forces a cycle on the electrolyte, circulation taking place from bottom to top, so that a very intense intermixing occurs. Long-term testing has revealed that the electrolyte concentration in areas a, b and c is virtually the same and also has the correct stoichiometric ratio. Thus, also electrode portions a and c, which could only be partly utilized in conventional batteries, are now completely utilized.

Besides increasing the battery capacity, the invention has numerous further advantages. The improved intermixing ensures that there is no solid electrolyte deposit formation, which in conventional batteries reduces both power and service life. Particular mention is also made of the greatly improved cold starting characteristics of the inventive battery.

It is clear to the expert that the battery according to the invention has a preferred installation direction and this is chosen in such a way that there is an optimum circulation of the electrolyte. Thus, in a car the battery must be so installed that the electrode plates are oriented in the direction of travel.

Figure 8:
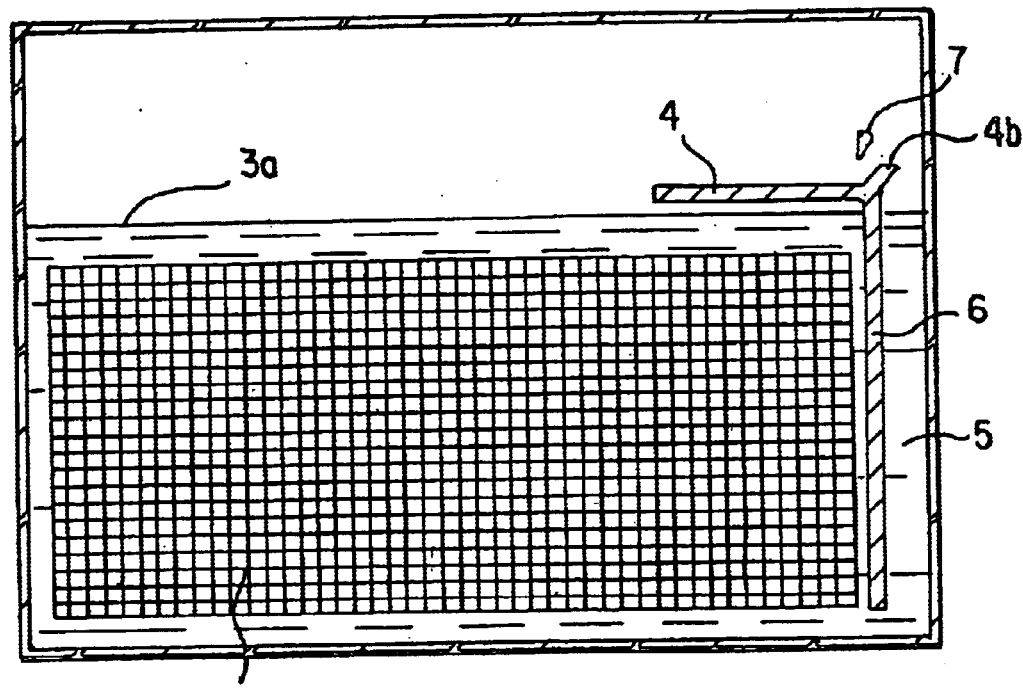
FIG. 8 shows a second embodiment of the invention.

FIGS. 8 and 10 to 14 show further embodiments of the invention. Thus, FIG. 8 shows on the angle element 4, 6 a web-like extension 4b, which can be vertical or inclined. This extension 4b prevents the rapid flow back of the electrolyte and consequently improves its intermixing.

Figure 9:
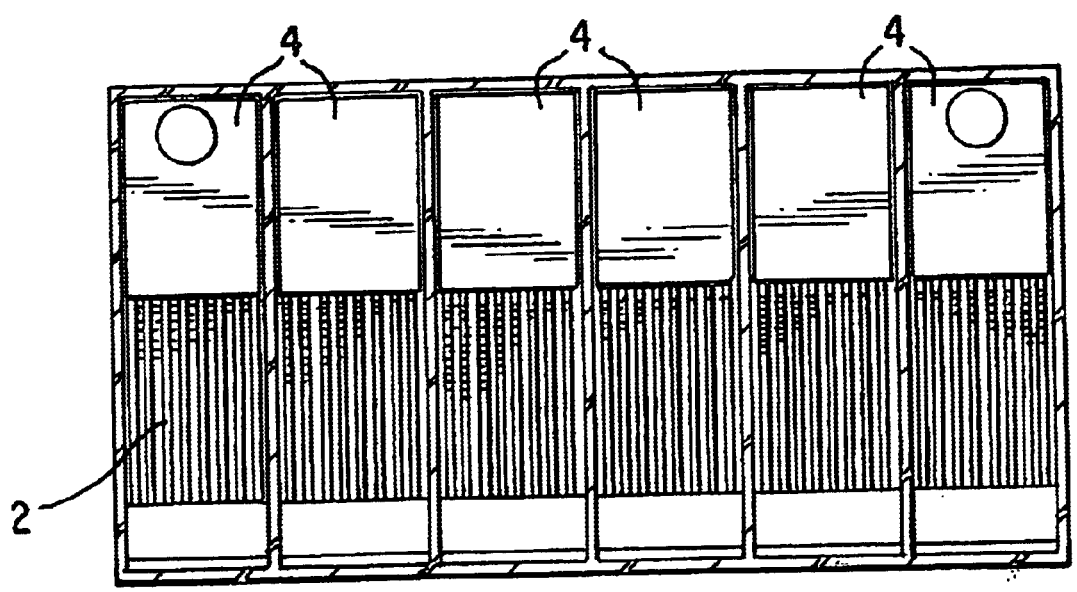
FIG. 9 is a plan view of an open, inventive liquid electrolyte battery with a one-sided circulating device.

FIG. 9 is a plan view of the opened battery with six cells, in which is in each case placed an angle element 4, 6.

Figure 10:
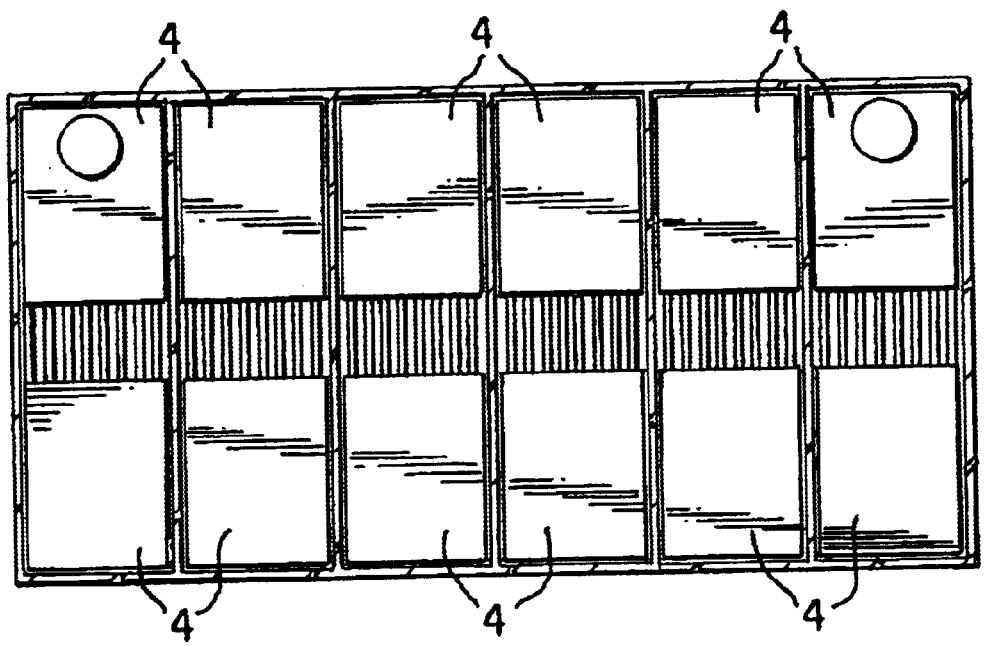
FIG. 10 shows a plan view of an open, inventive liquid electrolyte battery with a two-sided circulating device.
Figure 12A:
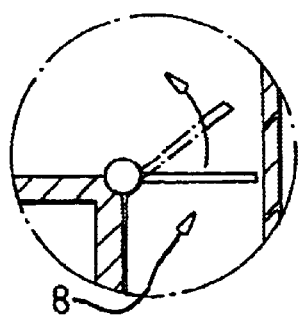
FIGS. 12, 12a, 12b, 12c show a fourth embodiment of the invention in detail, wherein FIG. 12 schematically shows a second type of flap valve
Figure 12B:
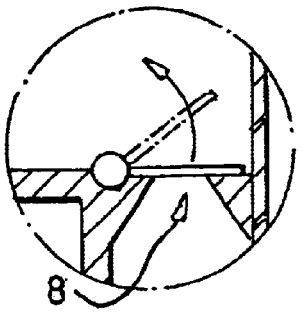
Figure 12C:
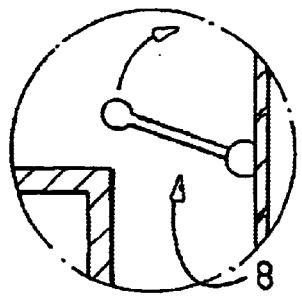
Figure 12:
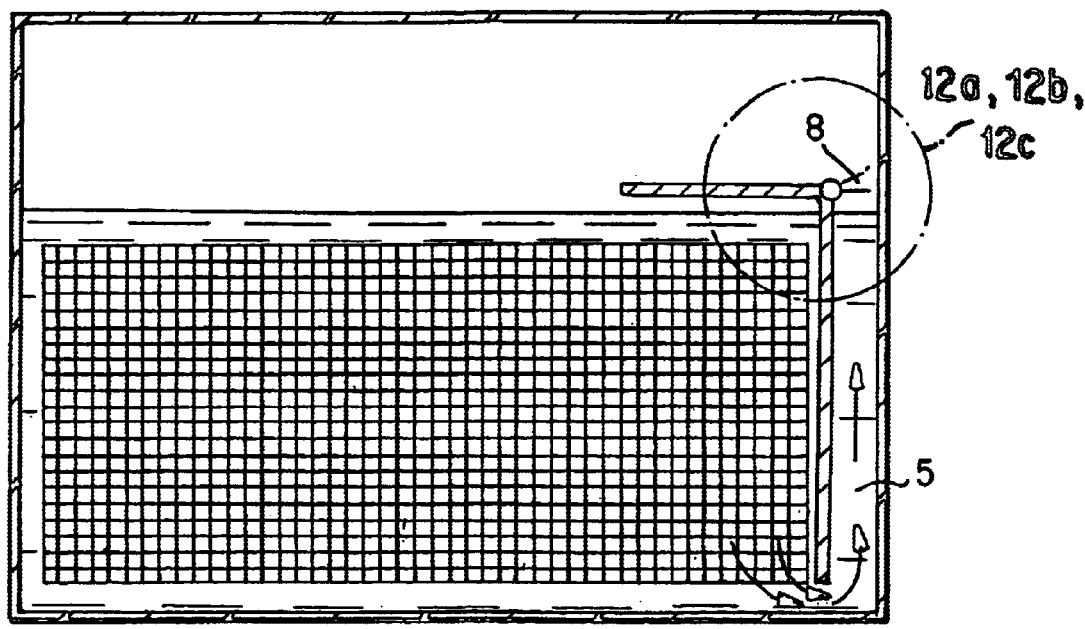

As the battery, particularly in cars, is accelerated in both directions by braking and accelerating actions, intermixing is improved if two angle elements per cell are installed in oppositely directed manner, as shown in FIG. 10 and as a result of the similarity of the action no further explanation is required by the expert.

FIG. 11 shows a further and/or additional possibility for preventing return electrolyte flow. As shown in FIG. 11, on angle element 4, 6 can be placed a flexible plate in such a way that a valve action occurs. If the electrolyte rises in the flow channel, the flexible plate engages on the wall to which it is fixed, i.e. the valve is opened. If the electrolyte flows back, the valve closes. The constructional details and the opening and closing phase are shown in FIGS. 11a to 11c and should require no additional explanations for the expert.

FIGS. 12 and 12a–12c show a modification of the principle according to FIG. 11. The structure and action of this flap valve are apparent from the drawings.

Figure 13:
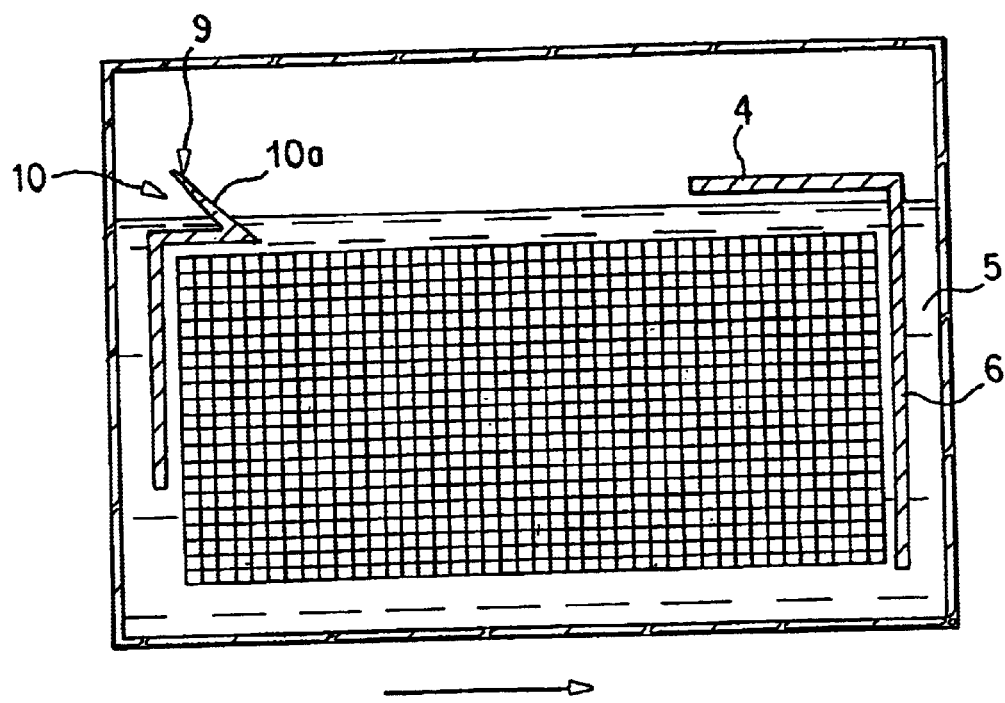
FIG. 13 shows a fifth embodiment of the invention in detail.

FIG. 13 shows a second return flow preventer 9, which can be used in opposition to the direction of travel in car batteries. In place of a horizontal side, said device has a rearwardly open volume 10. If, according to FIG. 7, a back-flowing wave is formed, it passes over the slope 10a and is held back by the open volume 10, so that the electrolyte sinks downwards along the vertical side and consequently an intermixing takes place.

It must be stressed that the return flow preventers shown can be further modified. Thus, at e.g. specific points in the angle elements, openings can be provided, in order to prevent the formation of dead areas, i.e. areas where an inadequate intermixing takes place. The dimensioning of the return flow preventer for a specific battery type requires no inventive activity on the part of the expert when knowing the teaching involved. The expert will also take further intermixing-aiding measures, which are not expressly mentioned in the present invention. Thus, it is e.g. advantageous to so design the electrolyte flow paths that within the flows forced by the battery movement a limited flow resistance occurs, which can inter alia be achieved by very smooth walls and by the avoiding of projections where eddies can form.

Figure 14:
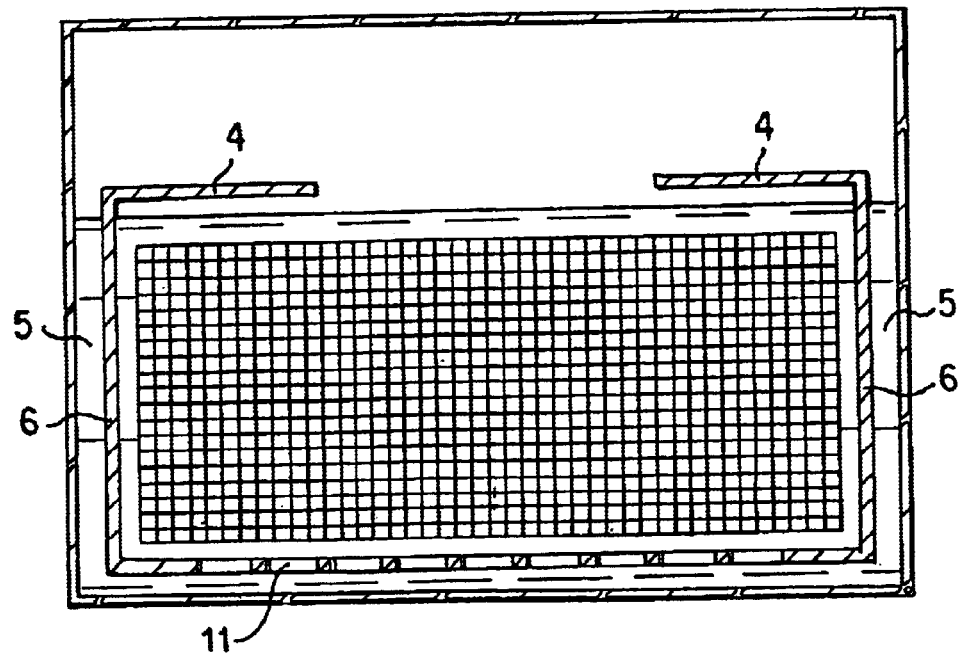
FIG. 14 shows a sixth embodiment of the invention.

FIG. 14 shows a double-sided embodiment according to FIG. 10, where the two angle elements are linked by a perforated plate 11. This embodiment is advantageous from the assembly standpoint, because the electrode plates are held together in clamp or clip-like manner and can be easily automatically fitted. The action of the perforation is made clear to the expert on referring to FIG. 5.

Figure 15:
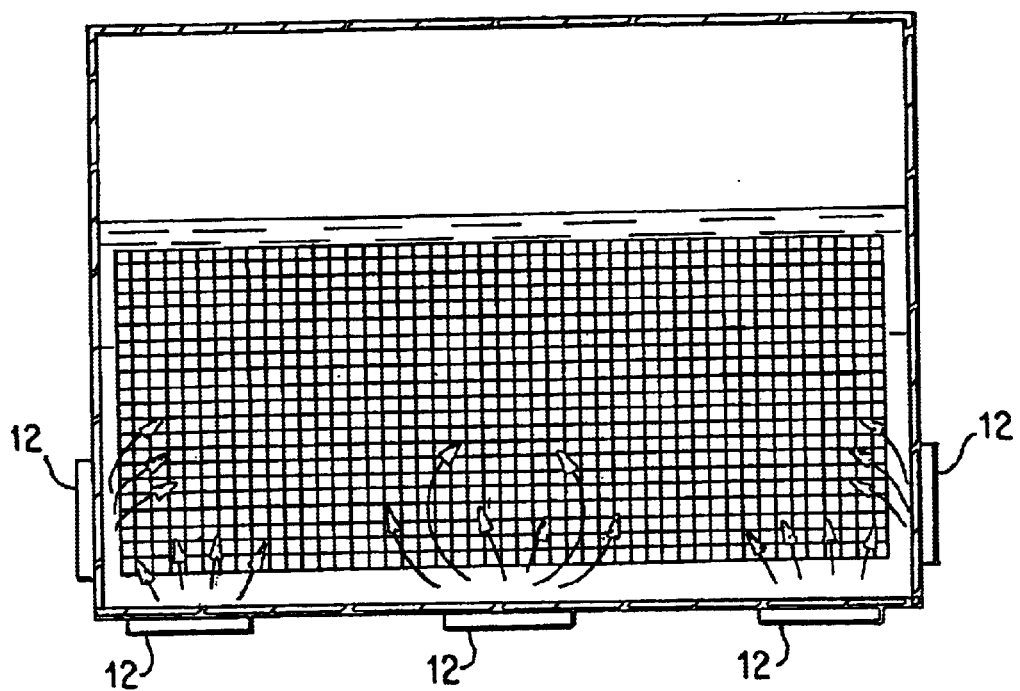
FIG. 15 shows another embodiment of the invention, wherein circulation takes place by heating.

FIG. 15 shows another embodiment of the invention, where electrolyte circulation takes place by heating. For this purpose external electric heating elements are located in the lower area of the battery box. On heating, the neighboring electrolyte also heats and rises upwards and consequently brings about an intermixing. The heating elements are preferably of a very flat type, such as film or foil heaters. These heaters can be gathered from the prior art. As a result of the simple action, no further operational explanations are needed. It is stressed that the heaters 12 are not mainly used for heating the electrolyte, but instead for producing a convective flow, which brings about an intermixing. Therefore the heaters are not uniformly distributed over the entire bottom surface and are instead located at predetermined points, so that a very strong flow is produced.

Figure 17:
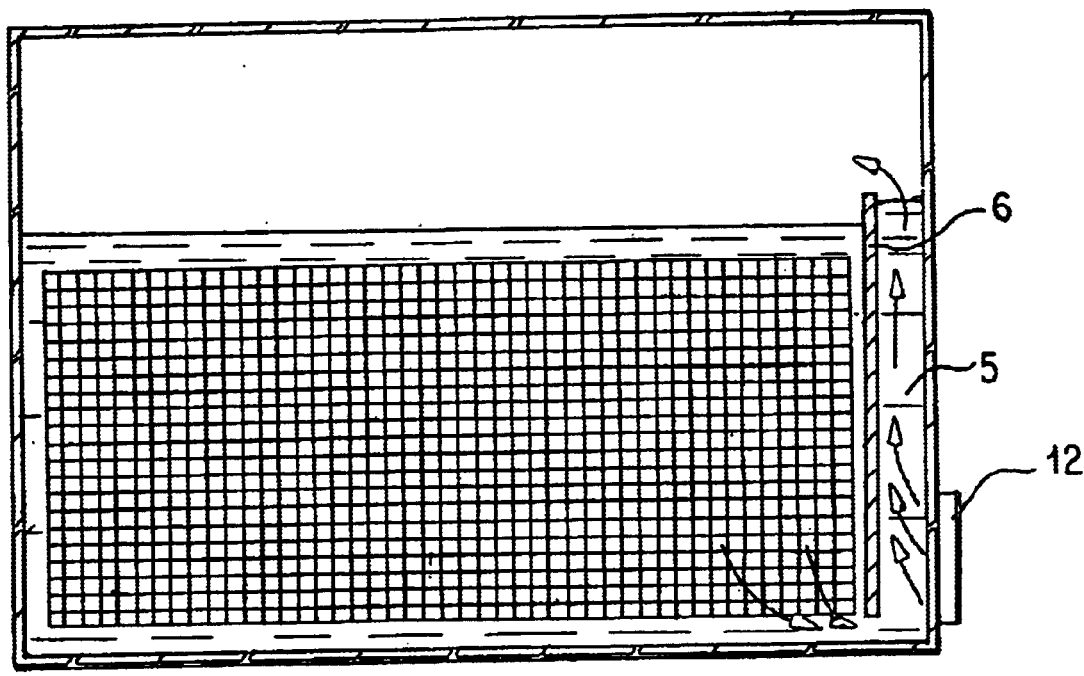
FIG. 17 shows a combination of mechanical and thermal circulation.

If only a single heater or heaters with a high capacity are used, it may be necessary for the protection of electrodes 2 to provide a heat protection means between the latter and the heater. This heat protection ensures that the strongly heated electrolyte does not come into contact with the electrodes, because the latter could be damaged by the heat. In FIG. 17 the heat protection is constructed as a flat plate, which can be dimensioned in the same way as the first plate-like element 6. It must be ensured that the heated electrolyte runs over the upper edge of the heat protection means or can pass through an opening in the plate.

The particular advantage of convective mixing by heat infeed is that the battery need not be moved. In the case of low external temperatures the electrolyte is simultaneously heated, which is also desirable.

Figure 16:
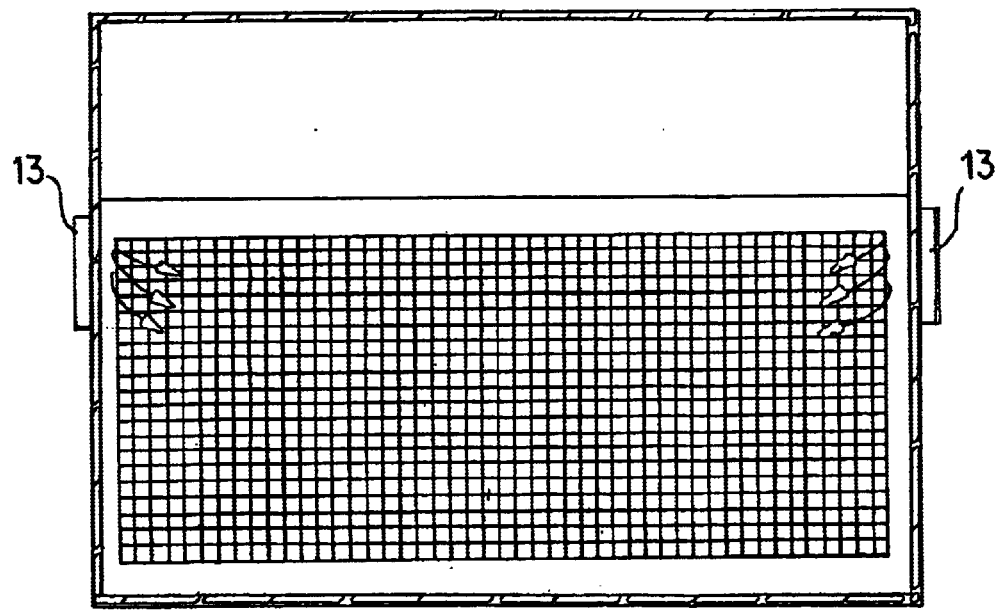
FIG. 16 shows another embodiment of the invention, in which circulation takes place by cooling.

If, for operational reasons, battery heating is not desired, then according to FIG. 16 a convective mixing can also be brought about by a cooling element. Due to the oppositely directed convection, an external cooling element is placed in the upper marginal area of the battery box, i.e. preferably below the electrolyte level.

Figure 18:
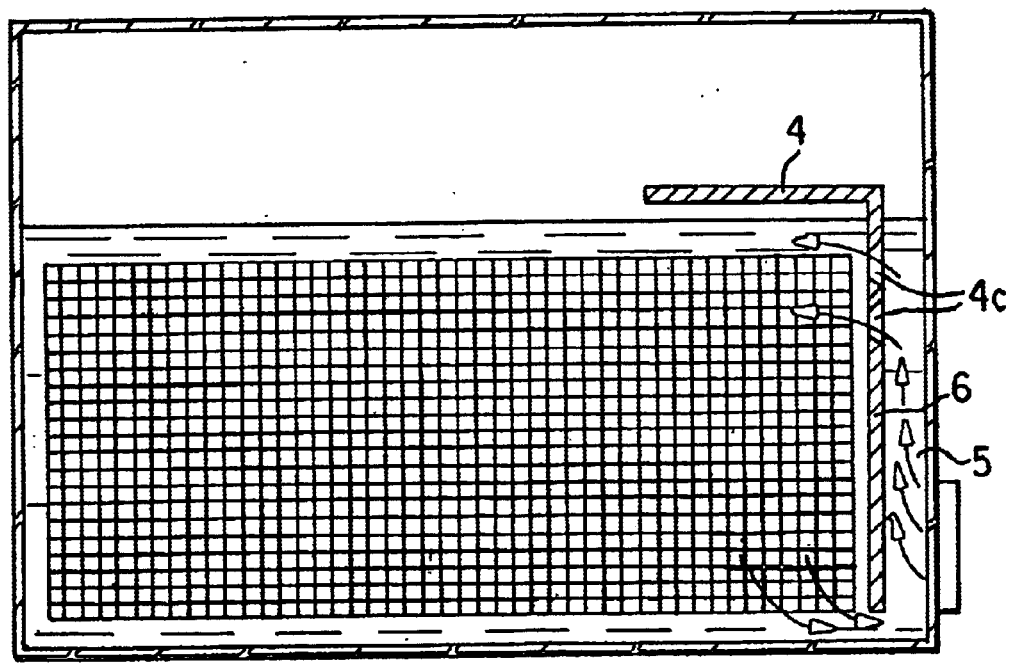
FIG. 18 shows a further combination of mechanical and thermal circulation.

FIG. 18 shows a combination of mechanical and thermal circulation by heating. The vertical side of the angle for mechanical intermixing simultaneously serves as a heat protection during thermal intermixing. To permit the outflow of the heated, upwardly flowing electrolyte, the vertical side has holes 4c.

Figure 19:
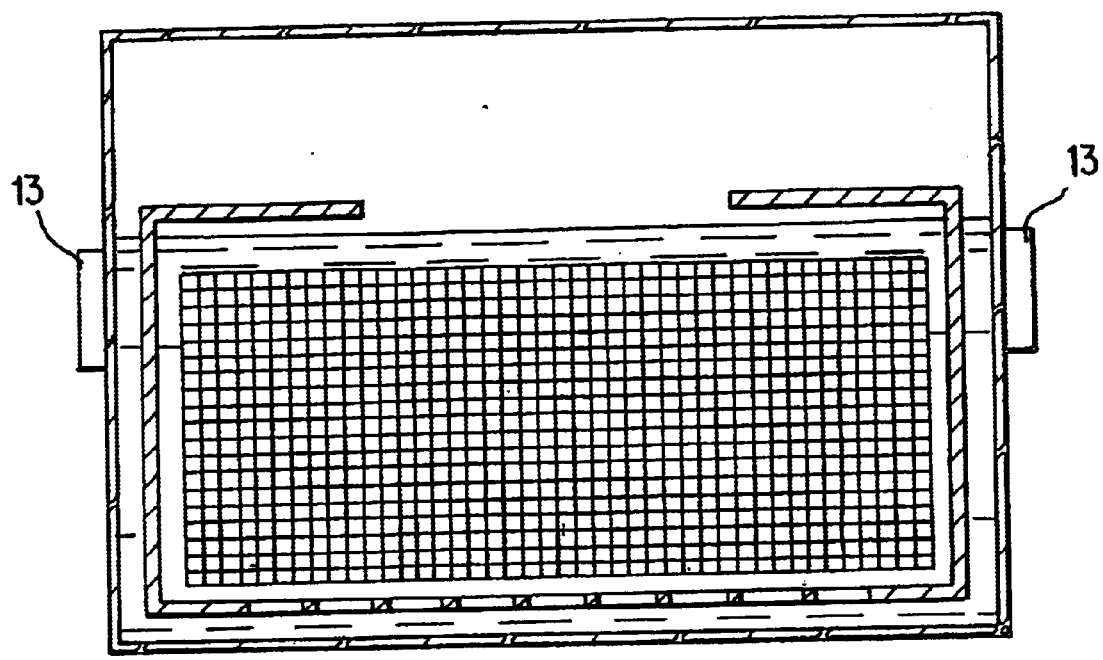
FIG. 19 shows a combination of mechanical and thermal circulation by cooling.

As in the embodiment according to FIG. 18, FIG. 19 shows a combination of mechanical and thermal circulation by cooling and the construction is readily apparent from the drawing. Peltier elements are used for cooling purposes. The function of this arrangement is apparent from the already explained contexts and the drawing.

Figure 20:
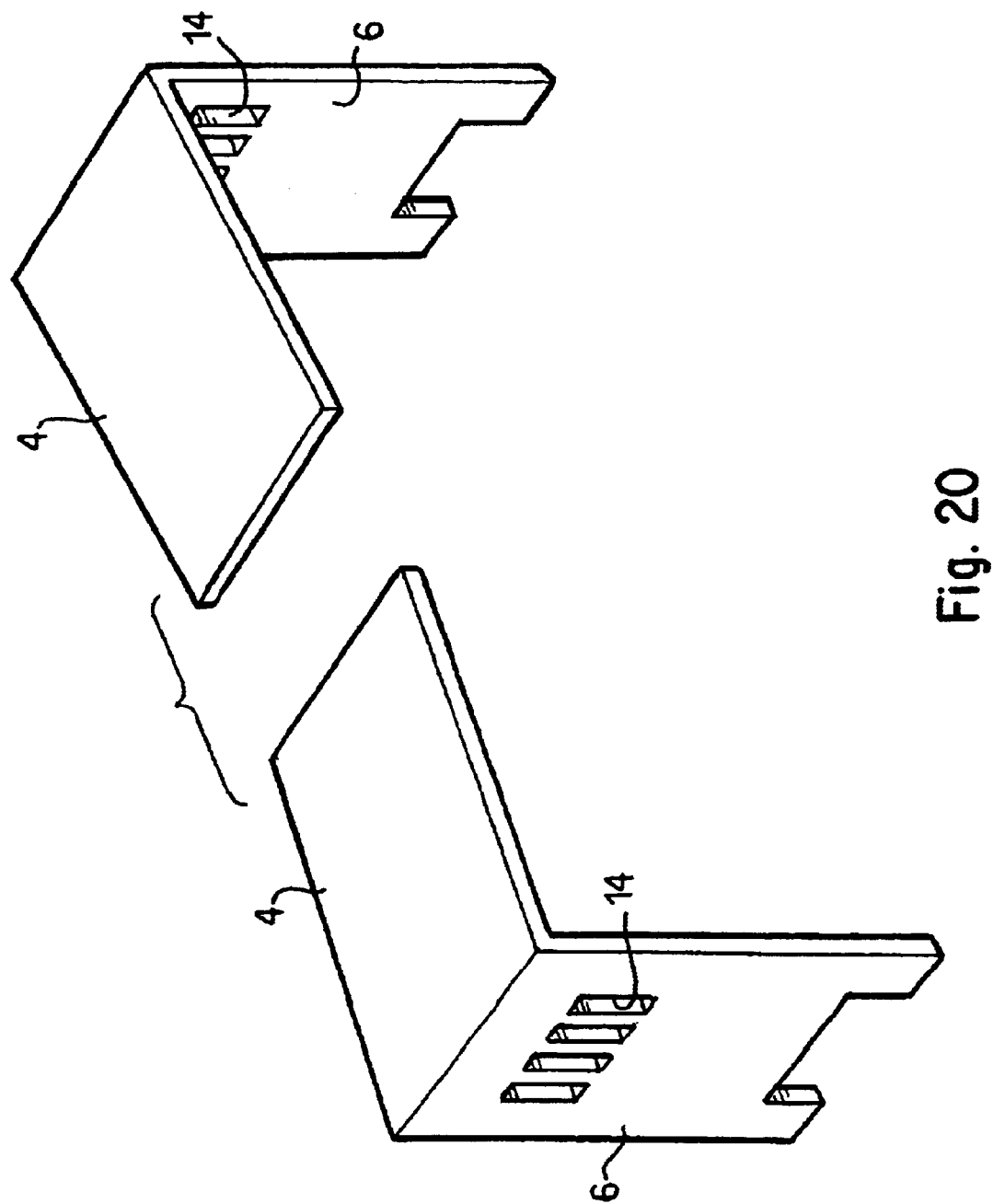
FIG. 20 shows an angular mixing device with flow slots.

FIG. 20 shows intermixing angle elements with flow slots 14, which improve the flow conditions for different electrolyte levels.

Figure 21A:
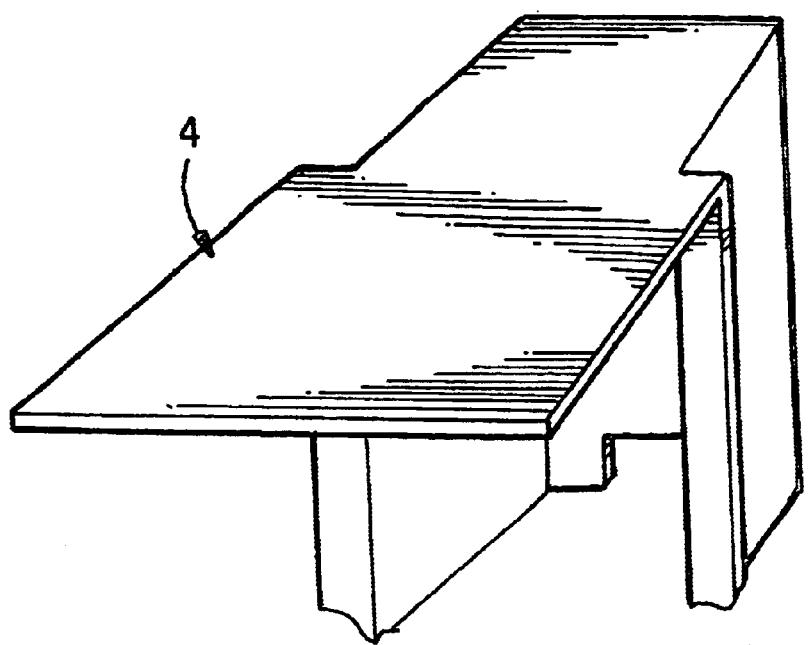
Figure 21B:
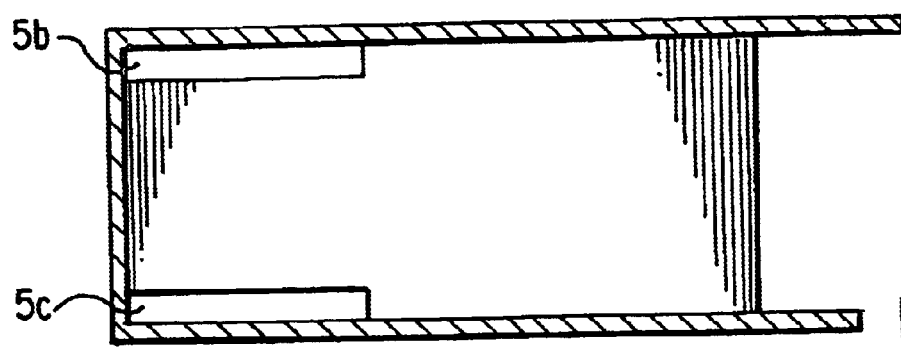
Figure 21C:
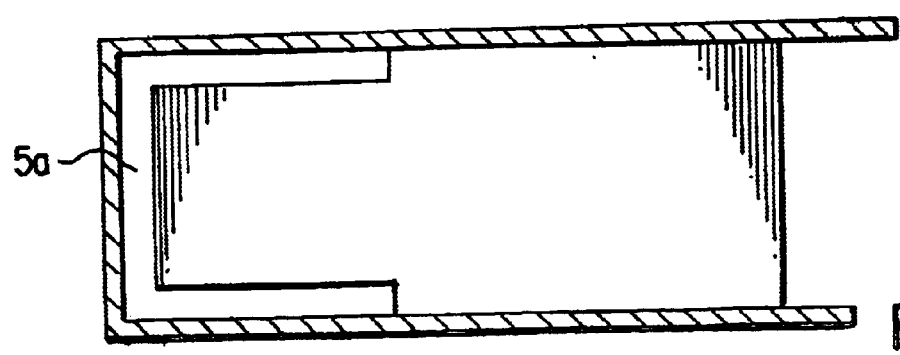

FIG. 21 shows an intermixing angle element, which is suitable for forming different flow channels 5a. FIG. 21a is a perspective view of the intermixing angle element, and FIGS. 21b and 21c show the incorporated angle element in plan view. In the arrangement according to FIG. 21c, there is a U-shaped flow channel cross-section and in the arrangement according to FIG. 21b two facing flow channels.

Figure 22A:
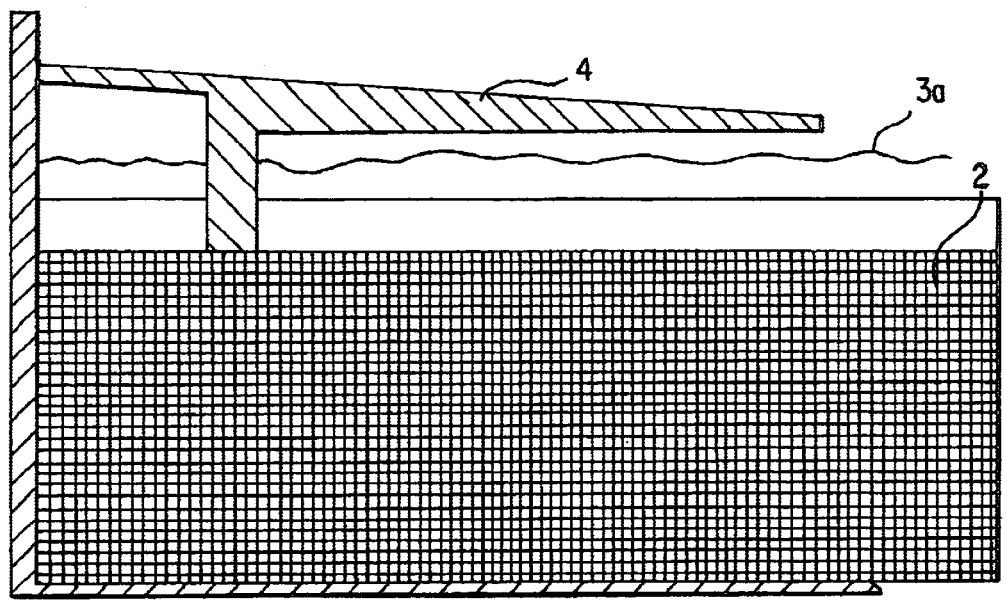
Figure 22B:
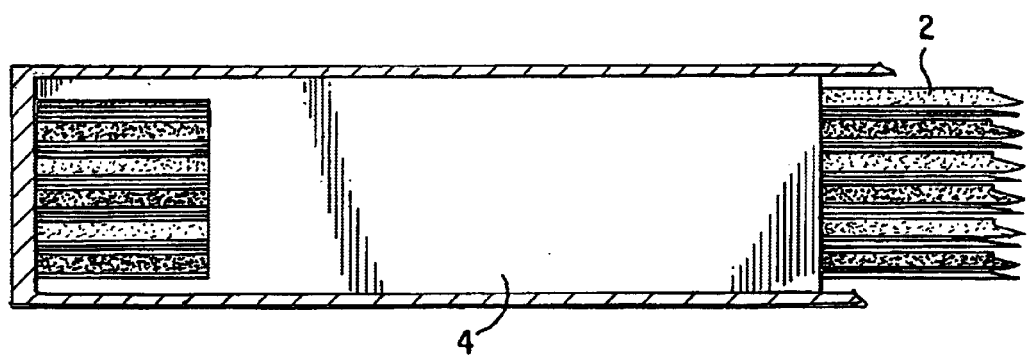

FIG. 22 shows an intermixing plate 4, with FIG. 22a showing a side cross-section of a battery. The plate 4 is installed on the plate set and in the same way as all the upper angle portions 4 is preferably inclined slightly towards the battery center. In this embodiment the battery wall takes over the function of the angle elements side 6.

Figure 23:
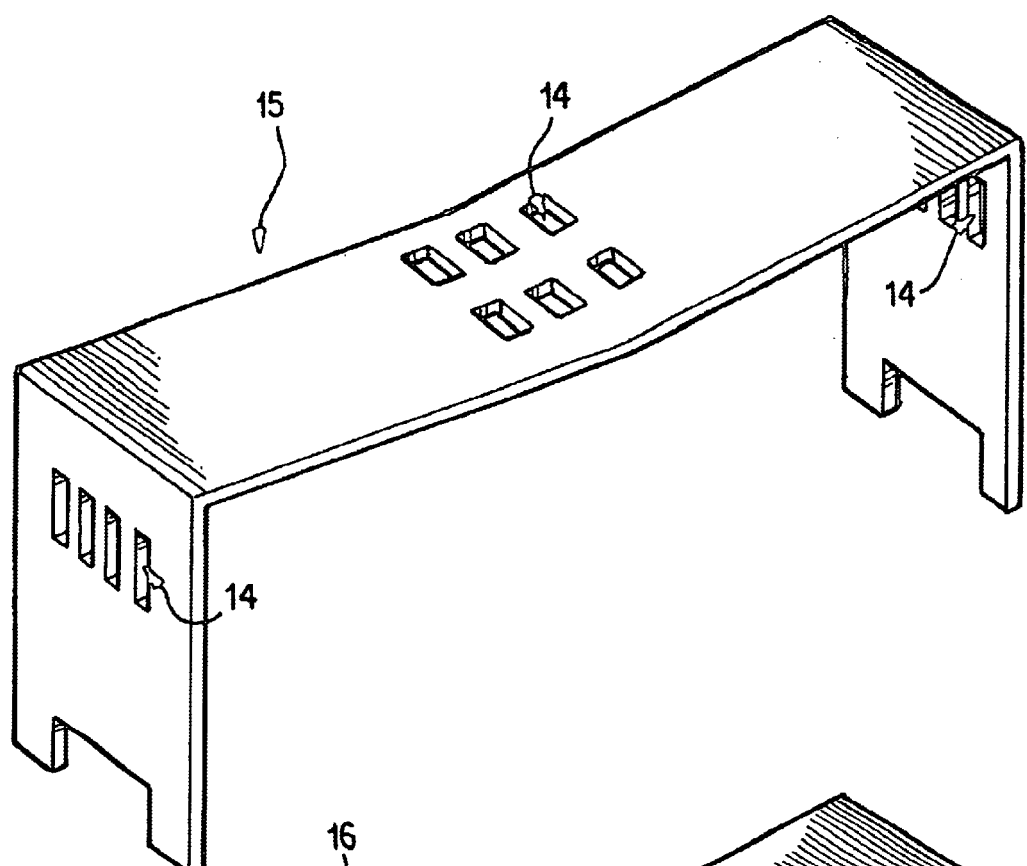
FIG. 23 shows another form of a mixing device.
Figure 24:
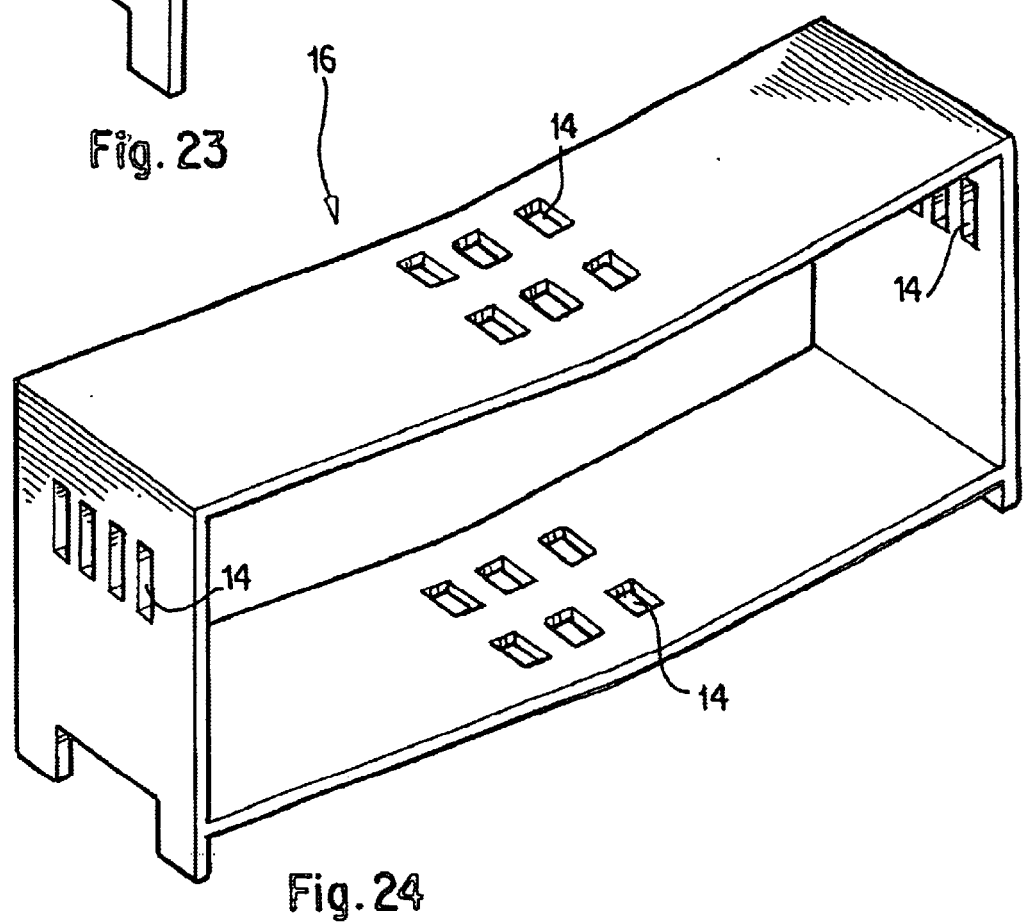
FIG. 24 shows another form of a mixing device.

FIGS. 23 and 24 show intermixing devices, in which both angle elements are interconnected to form a U or box-like unit 15, 16. The slots 14 have an electrolyte inflow/outflow function.

Figure 25:
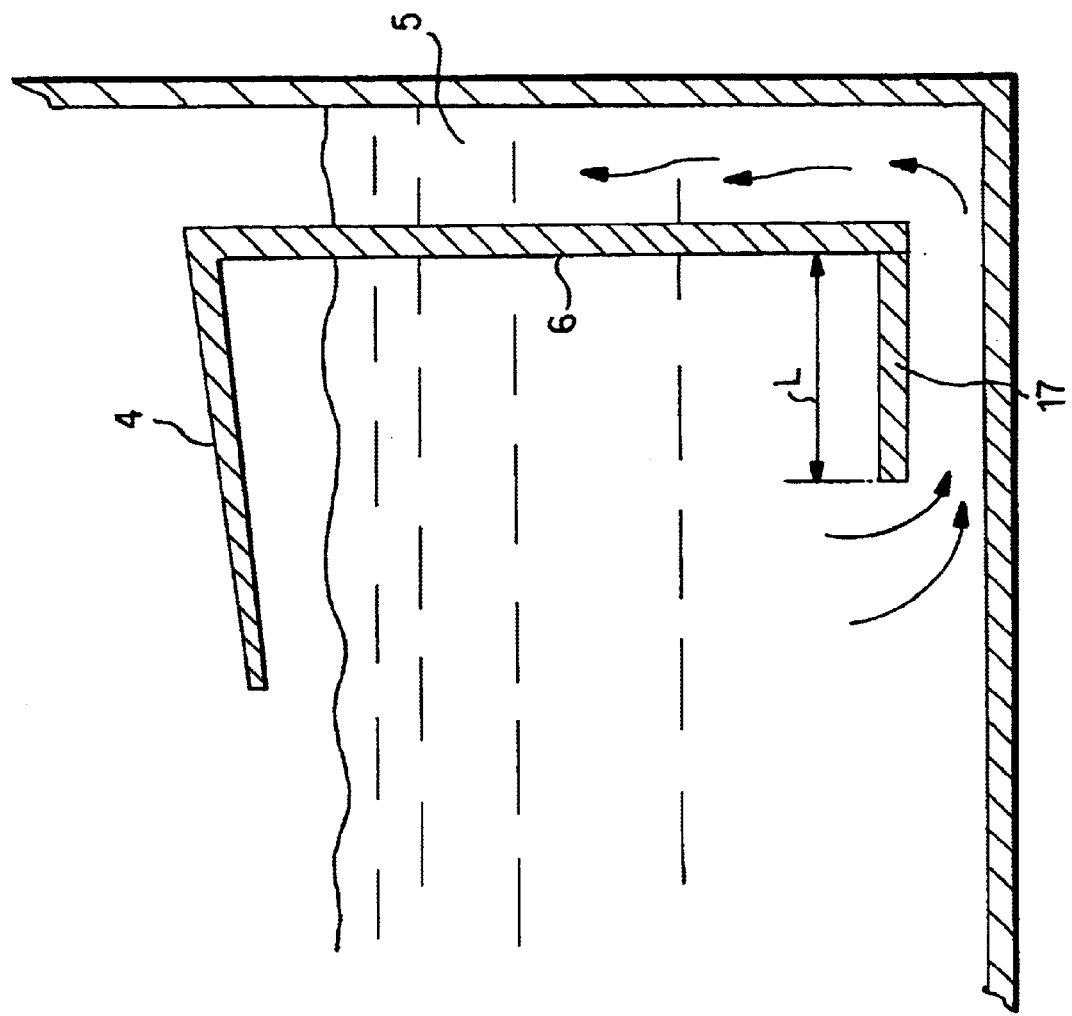
FIG. 25 shows another form of a mixing device.

FIG. 25 shows an intermixing angle element, which has on the lower portion of the vertical angle element's side 6 a horizontal side 17, directed towards the battery center and having a length L. This constructional measure makes it possible to optimize the flow conditions on introducing the electrolyte into the flow channel 5. The side 17 can also have holes or slots, if this leads to a flow condition improvement.

Figure 26A:
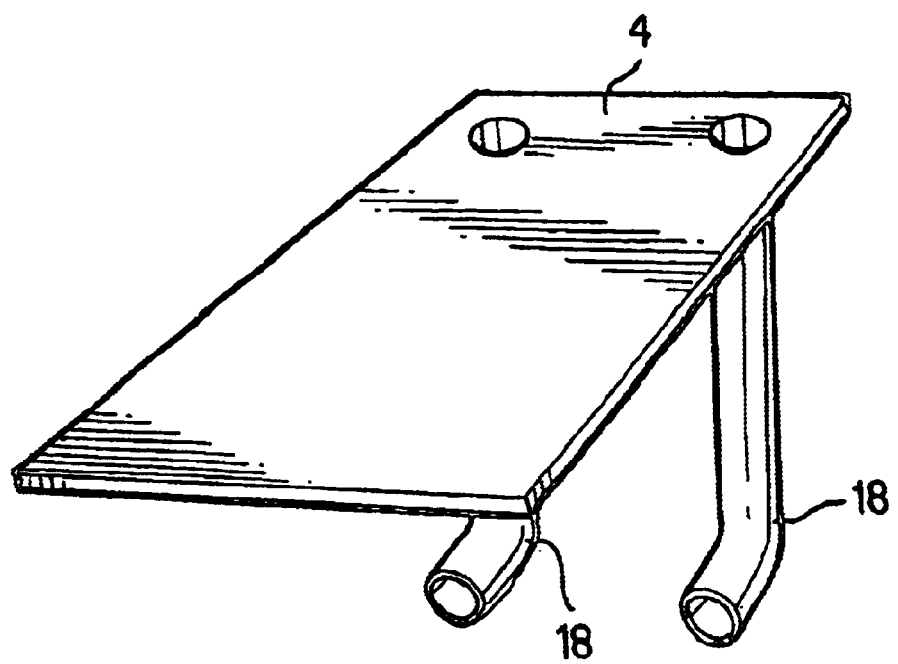
Figure 26B:
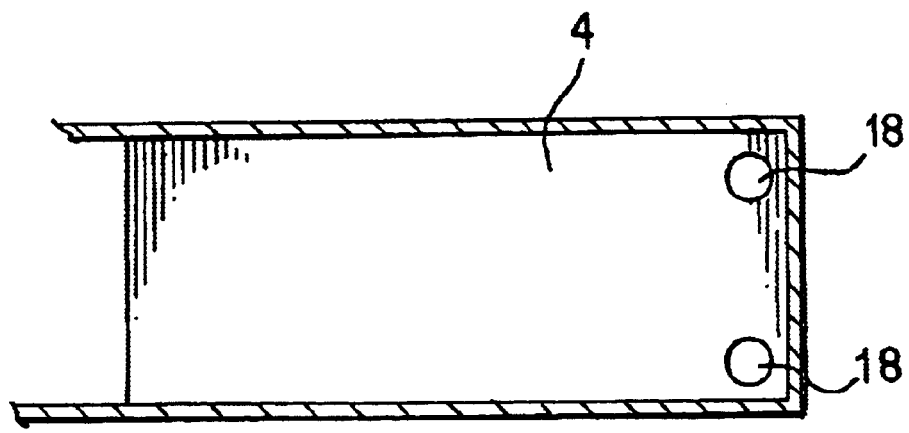

FIG. 26 shows an intermixing angle element, whose flow channel is formed by two tubes 18.

Figure 27:
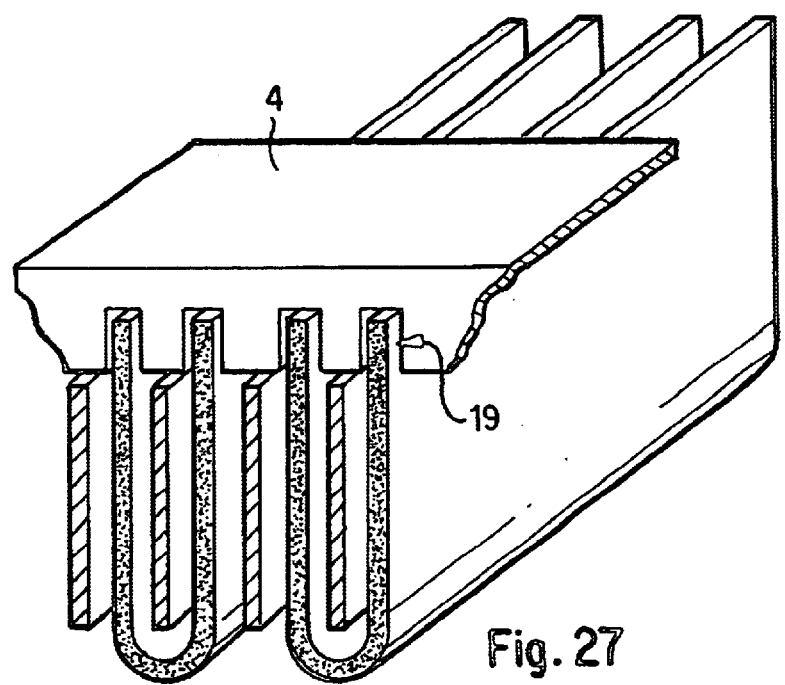
FIG. 27 shows another form of a mixing device.

FIG. 27 shows an intermixing angle element similar to FIG. 22. This angle element has portions 19, which permit an anchoring of the angle element in the plate set and simultaneously mechanically stabilize the set. This is merely a constructional detail.

Figure 28:
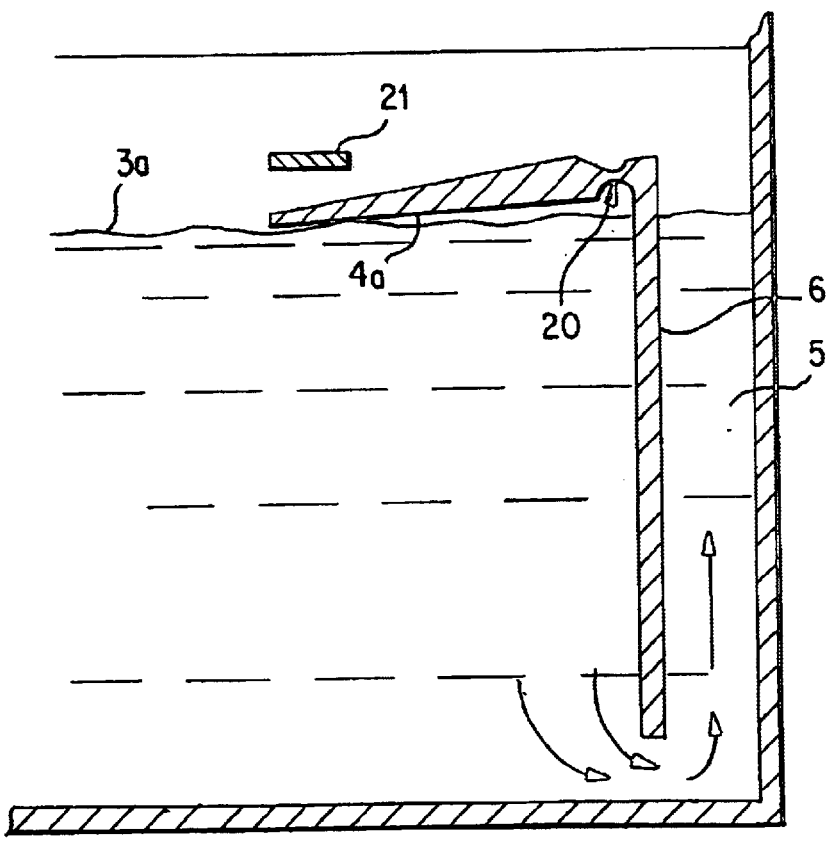
FIG. 28 shows a further form of a mixing device, which automatically adapts to different acid levels.
Figure 29A:
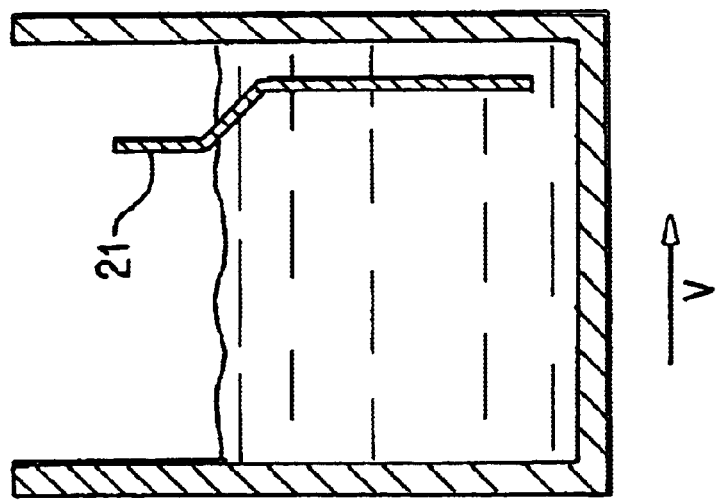
Figure 29B:
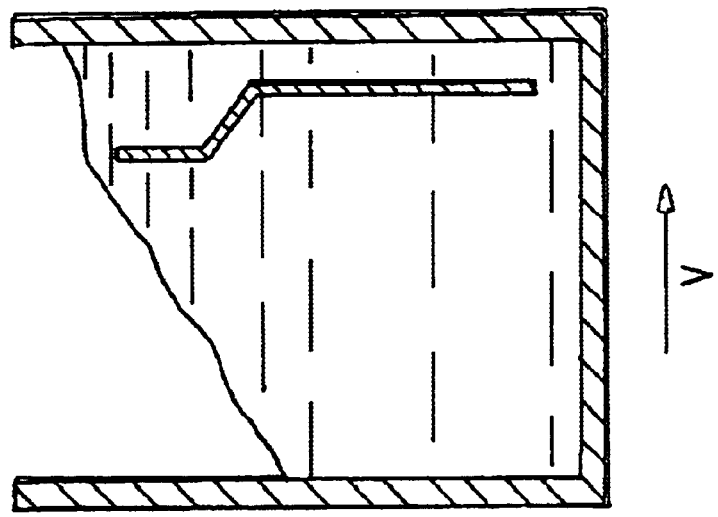
Figure 29C:
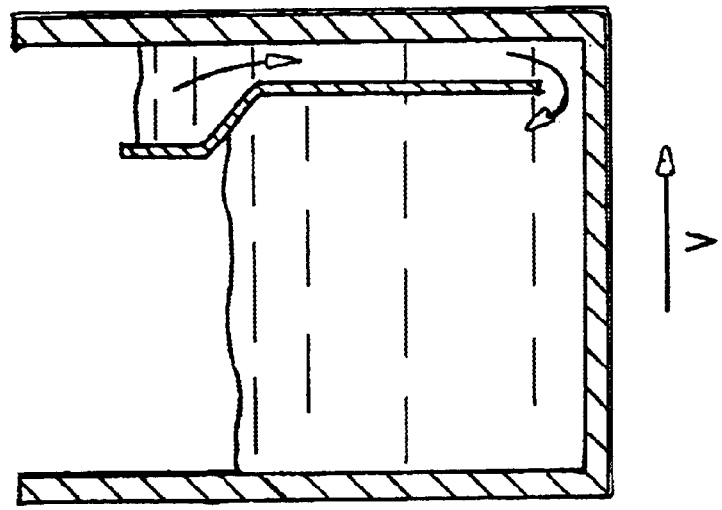

FIG. 28 shows an intermixing angle element with a movable side 4a, which is pivotably connected by means of a film hinge 20 to the vertical side 6. This movable side 4a floats on the electrolyte surface 3a. In the case of a suitable dimensioning, this arrangement improves the outflow of the electrolyte flowing upwards through the flow channel 6, so that intermixing is improved.

Taking account of the constructional and technological marginal conditions, the expert will choose one of the indicated variants and will optionally modify it without having to be involved in inventive activity.

By means of the embodiments described the expert can fully gather the technical teaching of the invention. It is clear that these embodiments can be further developed and modified or combined by an expert with the aid of the inventive teaching. Thus, even the embodiments not expressly mentioned or shown fall within the protective scope of the following claims.

What is claimed is:

1. Liquid electrolyte battery comprising:
a casing having side walls, a bottom, and a lid;
vertical electrode plates arranged in pairs to form cells within the casing;
a liquid electrolyte having a level disposed above upper edges of the electrodes;
an electrolyte circulating structure comprising:
a plate element disposed above the upper edges of the electrodes and extending across the upper edges in a direction away from a first of the side walls for restraining upward flow of electrolyte surging in a direction generally toward the first side wall, and
a vertical flow channel formed between the first side wall and vertical edges of the electrode plates for conducting an upward flow of the surging electrolyte to a location above the plate elements.

2. The battery according to claim 1 wherein the circulating structure further comprises a vertical plate disposed parallel to the vertical edges of the electrodes to form the flow channel.

3. The battery according to claim 2 wherein the first and second plate elements are secured together.

4. The battery according to claim 1 wherein the circulating structure further includes a return flow preventer for preventing downward flow of electrolyte through the flow channel.

5. The battery according to claim 4 wherein the return flow preventer comprises a web extending from the plate element toward the first side wall.

6. The battery according to claim 4 wherein the return flow preventer comprises a flap valve.

7. The battery according to claim 1 wherein the plate element and the flow channel constitutes a first plate element and a first flow channel, respectively, the circulating device further comprising a second plate element disposed above the upper edges of the electrodes and extending across the upper edges in a direction away from a second of the side walls situated opposite the first side wall, for restraining upward flow of electrolyte surging in a direction toward the second side wall, and a second vertical flow channel formed between the second side wall and vertical edges of the electrode plates for conducting an upward flow of the surging electrolyte to a location above the second plate element.

8. The battery according to claim 7 wherein the first and second plate elements are interconnected and include a vertical passage for conducting a downward flow of electrolyte received from at least one of the first and second flow channels.

9. The battery according to claim 4 further including a second flow preventer disposed above the upper edges of the electrode plates adjacent a second of the side walls disposed opposite the first side wall, the second flow preventer preventing flow of electrolyte in a direction toward the first side wall.

10. A liquid electrolyte battery comprising:
a casing having side walls, a bottom, and a lid;
vertical electrode plates arranged in pairs to form cells within the casing;
a liquid electrolyte having a level disposed above upper edges of the electrode plates; and
an electrolyte circulating structure comprising at least one heating element disposed externally of the casing adjacent the bottom thereof for heating a lower portion of the electrolyte through the casing, and a plate element disposed above the upper edges of the electrode and extending across the upper edges in a direction away from the first of the side walls for restraining upward flow of electrolyte surging in a direction toward the first side wall, and a vertical flow channel formed between the first side wall and vertical edges of the electrode plates for conducting an upward flow of the surging electrolyte to a location above the plate elements.

11. The battery according to claim 10 further including a heat protection plate disposed within the casing between the electrodes and a portion of the casing heated by the at least one heating element.

12. The battery according to claim 10 wherein the heating element is arranged to heat a portion of the first side wall, the electrolyte circulating structure further including a vertical plate disposed parallel to the vertical edges of the electrode plates to form the flow channel, the vertical plate arranged between the electrode plates and the portion of the first side wall being heated, to form a heat protector for the electrodes.

13. A liquid electrolyte battery comprising;
a casing having side walls, a bottom, and a lid;
vertical electrode plates arranged in pairs to form cells within the casing;
a liquid electrolyte having a level disposed above upper edges of the electrode plates; and
an electrolyte circulating structure comprising at least one cooling element disposed externally of the casing for cooling a portion of the casing disposed adjacent the electrolyte level for cooling an upper portion of the electrolyte through the casing,
wherein the circulating structure further comprises:
a plate element disposed above the upper edges of the electrode and extending across the upper edges in a direction away from a first of the side walls for restraining upward flow of electrolyte surging in a direction toward the first side wall, and
a vertical flow channel formed between the first side wall and vertical edges of the electrode plates for conducting an upward flow of the surging electrolyte to a location above the plate elements.

* * * * *